(12) United States Patent
Palmer et al.

(10) Patent No.: US 12,316,269 B2
(45) Date of Patent: May 27, 2025

(54) ROCKING SOLAR PANEL SUN TRACKING MOUNTING SYSTEM

(71) Applicant: KEMHI LLC, Mason, OH (US)

(72) Inventors: Darin Palmer, Mason, OH (US); Jordyn Palmer, Mason, OH (US); Logan Palmer, Mason, OH (US)

(73) Assignee: KemHi LLC, Mason, OH (US)

( * ) Notice: Subject to any disclaimer, the term of this patent is extended or adjusted under 35 U.S.C. 154(b) by 316 days.

(21) Appl. No.: 17/433,110

(22) PCT Filed: Dec. 5, 2019

(86) PCT No.: PCT/US2019/064582
§ 371 (c)(1),
(2) Date: Aug. 23, 2021

(87) PCT Pub. No.: WO2020/185271
PCT Pub. Date: Sep. 17, 2020

(65) Prior Publication Data
US 2022/0149774 A1    May 12, 2022

Related U.S. Application Data

(60) Provisional application No. 62/816,073, filed on Mar. 9, 2019.

(51) Int. Cl.
*H02S 20/32* (2014.01)
*F24S 30/00* (2018.01)
(Continued)

(52) U.S. Cl.
CPC ............ *H02S 20/32* (2014.12); *F24S 30/425* (2018.05); *F24S 30/455* (2018.05); *F24S 30/48* (2018.05);
(Continued)

(58) Field of Classification Search
CPC .......... H02S 20/32; H02S 40/22; H02S 50/00; F24S 30/425; F24S 30/455; F24S 30/48;
(Continued)

(56) References Cited

U.S. PATENT DOCUMENTS

2003/0169200 A1 * 9/2003 Urban ..................... F24S 50/20
126/593
2012/0318325 A1 * 12/2012 Liu ........................ H01L 31/054
136/246

(Continued)

FOREIGN PATENT DOCUMENTS

AT             513502 B1 *  5/2014
KR        20080023824 A  *  3/2008

OTHER PUBLICATIONS

Lehner, AT-513502-B1, Machine Translation (Year: 2014).*
Hong, KR20080023824A, Machine Translation (Year: 2008).*

*Primary Examiner* — Devina Pillay
(74) *Attorney, Agent, or Firm* — Jenei LLC

(57) ABSTRACT

A solar power collection system includes one or more photovoltaic (PV) panel assemblies positioned by one or more tracker drive units. Each PV panel assembly includes at least one PV panel comprising PV cells that collect solar energy and a base attached to the PV panel. The base includes at least one curved rocker surface that presents a first convex surface in at least a first direction to a substrate. The base is positionable on the substrate with the first direction aligned with an east-west orientation. The tracker drive unit is mechanically coupled to the base via a selected one of: (i) a drive rod; (ii) a closed loop cable; (iii) a torsion mechanism to impart a selected amounting of rolling-rocking movement of the base across the substrate to position the PV panel to efficiently receive sunlight.

13 Claims, 14 Drawing Sheets

(51) Int. Cl.
*F24S 30/425* (2018.01)
*F24S 30/455* (2018.01)
*F24S 30/48* (2018.01)
*F24S 50/20* (2018.01)
*F24S 50/60* (2018.01)
*H02S 50/00* (2014.01)

(52) U.S. Cl.
CPC .............. *F24S 50/20* (2018.05); *F24S 50/60* (2018.05); *H02S 50/00* (2013.01); *F24S 2030/134* (2018.05); *F24S 2030/136* (2018.05); *F24S 2030/14* (2018.05)

(58) Field of Classification Search
CPC .. F24S 30/45; F24S 50/20; F24S 50/60; F24S 23/74; F24S 2030/134; F24S 2030/136; F24S 2030/14; F24S 2030/133; F24S 2030/115; Y02B 10/10; Y02E 10/47; Y02E 10/52
See application file for complete search history.

(56) References Cited

U.S. PATENT DOCUMENTS

2013/0133641 A1* 5/2013 Shvets .................... F24S 50/60
126/714
2015/0377520 A1* 12/2015 Kufner .................. F24S 30/425
126/605

* cited by examiner

ROCKING SOLAR PANEL SUN TRACKING MOUNTING SYSTEM

CLAIM OF PRIORITY UNDER 35 U.S.C. § 119

The present Application for Patent claims priority to Provisional Application No. 62/816,073 entitled "Rocking Solar Panel Sun Tracking Mounting System" filed Mar. 9, 2019, and hereby expressly incorporated by reference herein.

BACKGROUND

1. Technical Field

The present disclosure generally relates to solar power collection panels, and more specifically to tracker drive system for an array of solar power collection panels.

2. Description of the Related Art

A photovoltaic (PV) system converts sunlight into electricity. Sunlight is a low-density form of energy; thus, significant development has occurred in creating PV panels containing PV cells with improved energy conversion efficiency. In addition, solar collection arrays are scaled up to a large number of PV panels in order to collect a greater amount of energy. To withstand wind and weather while tracking, generally known solar collection arrays include elaborate mounting structures that are labor intensive, difficult to adapt to various terrains, and expensive to install and maintain. Fixed position solar panel systems are the least expensive, but the stationary position limits electrical efficiency. Tilting positioning solar panel systems include single axis mechanisms that position each panel to track the east-west daily movement of the sun. Tilting positioning solar panel systems also include dual axis mechanisms that also adjust for north-south seasonal variations in the movement of the sun. With improvements to the infrastructure, solar collection arrays can provide more cost effective electricity.

BRIEF SUMMARY

In one aspect, the present disclosure provides a rocking solar panel mounting system which aims to combine the benefits of a "floating" solar panel system with the benefits of a tracking system through a rocking motion to track the sun, reducing the cost of expensive roof or ground preparations, eliminating the need for rotating friction bearings, and reducing installation costs with fewer parts, while still gaining the efficiencies of a tracking system. In one or more embodiments, the present disclosure still gains the efficiencies of a tracking system. The solid frame system combined with geared torque tube/profile, wire-ropes, or rods, would last longer than the inflatable rocking solution and protect the solar system better from wind and adverse forces as a long lifetime solar tracking collection solution.

In another aspect, the present disclosure provides a solar power collection system that includes one or more photovoltaic (PV) panel assemblies positioned by one or more tracker drive units. Each PV panel assembly includes at least one PV panel comprising PV cells that collect solar energy and a base attached to the PV panel. The base includes at least one curved rocker surface that presents a first convex surface in at least a first direction to a substrate. The base is positionable on the substrate with the first direction aligned with an east-west orientation. The tracker drive unit is mechanically coupled to the base via a selected one of: (i) a drive rod; (ii) a closed loop cable; (iii) a torsion mechanism to impart a selected amounting of rolling-rocking movement of the base across the substrate to position the PV panel to efficiently receive sunlight.

In an additional aspect, the present disclosure provides a method of efficiently and economically collecting solar energy.

In an additional aspect, the present disclosure provides for a tracking system that operates on dual axis operation. A dual axis of operation requires both a fixed position from north to south and a fixed position from east to west while tracking the sun throughout the day. A dual axis of operation allows for optimum solar energy levels due to its ability to follow the sun both vertically and horizontally. In the illustrated embodiment, the tracking system is a computer driven tracking system which operates on one or two axis of operation. In an alternative embodiment, the tracking system is a sensor driven tracking system which operates on single or dual axis of operation. In even further alternative embodiments, the tracking system operates on both computer and sensor tracking systems which operates on one axis of operation, dual axis of operation, or a combination thereof.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
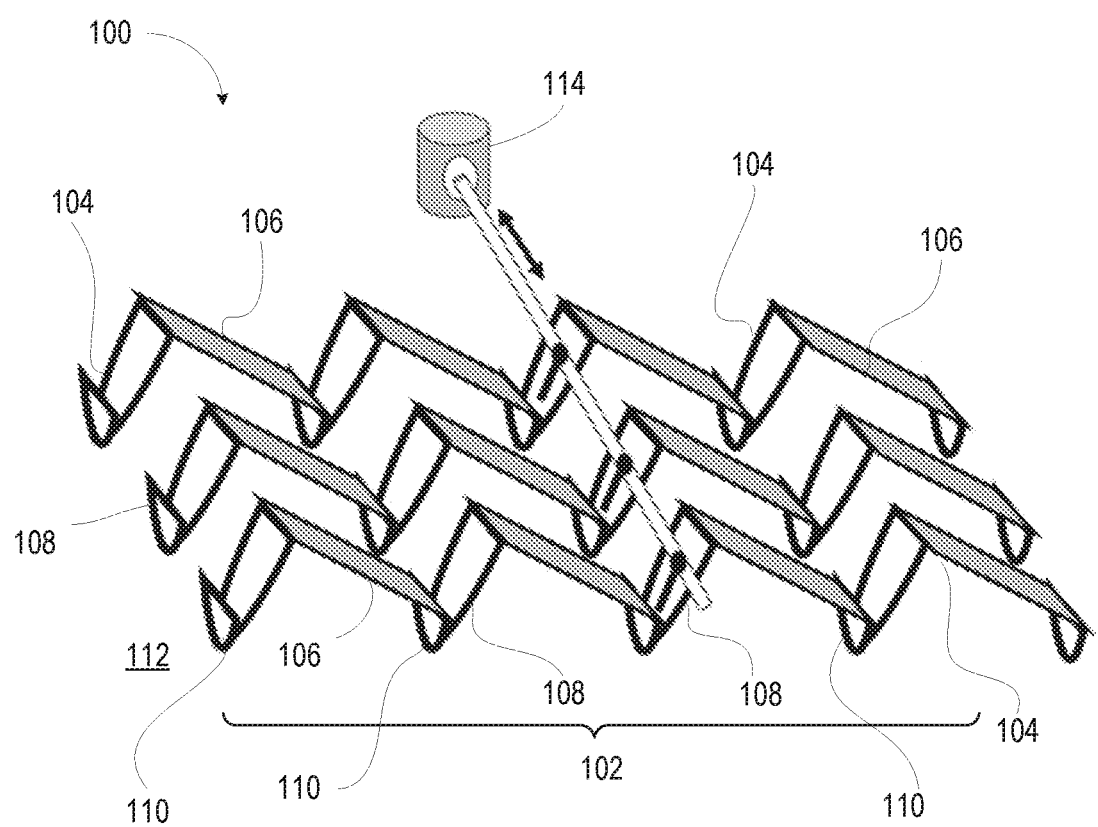
FIG. 1 depicts a solar power collection system including an array of photovoltaic (PV) panel assemblies, according to one or more embodiments.

The energy output of a photovoltaic solar panel changes based on the angle between the panel and the sun. The location of the sun throughout a given day directly correlates to a solar panels efficiency due to the specific angle the sunlight hits the panel, the angle of incidence. The angle of incidence is instrumental in choosing both a location and position of the solar panel. Solar panels comprise photovoltaic cell arrays that can produce electricity from a range of frequencies of light, but usually cannot cover the entire solar range throughout the day if the solar panel is in fixed position. Thus, many fixed solar panels use a solar tracking system to optimize the amount of sunlight that hits a photovoltaic solar panel. Even with use of a tracking system, these solar panels do not steward power available per footprint area of a given solar panel. According to aspects of the present disclosure, a means for increasing the efficiency of photovoltaic cell arrays on a solar panel is provided In one or more aspects of the present disclosure, a system for rocking solar panel or an array of panels to track the sun is provided. This invention increases solar panel efficiency by tracking the sun through the day and seasons. The system is driven by a motor that rotates torque tube, pushes or pulls the rocking structure or panels and the system rocks and turns in the direction it is being pulled or pushed. Diagnostics can be included in the system to measure any obstructions or malfunctions in the system.

It should be understood that the terms "solar panel", "photovoltaic panel," or "PV panel" as used herein, refer to a device having one or more modules adapted to absorb sunlight as a source of energy in order to generate electricity. As used herein, "cell" is a schematic representation of a cell array. As used herein, "cell array" means one or more photovoltaic cells that are semiconductor devices that can convert solar energy into electricity. As used herein, "module" means an assembly of closely packed cell arrays. As used herein, "panel" means a connected series of cell arrays.

The term "track" or "tracking" used herein refers to an adaptability of the photovoltaic (PV) panels to be positioned relative to the sun or the solar absorbing surface of the PV panels being directed towards the sun. When the PV panels are tracking the sun, an angle of incidence with respect to a ray of light from the sun is minimized. An angle of incidence is an angle that a ray of light makes with a line perpendicular to the solar absorbing surface of the PV panels.

In one or more aspects of the present disclosure, a solar power collection system includes one or more photovoltaic (PV) panel assemblies positioned by one or more tracker drive units. Each PV panel assembly includes at least one PV panel comprising PV cells that collect solar energy and a base attached to the PV panel. The base includes at least one curved rocker surface that presents a first convex surface in at least a first direction to a substrate. The base is positionable on the substrate with the first direction aligned with an east-west orientation. The tracker drive unit is mechanically coupled to the base via a selected one of: (i) a drive rod; (ii) a closed loop cable; (iii) a torsion mechanism to impart a selected amounting of rolling-rocking movement of the base across the substrate to position the PV panel to efficiently receive sunlight.

A photovoltaic system, PV system, supplies power by means of photovoltaics. A PV system includes several components including: solar panels to absorb and convert sunlight into electricity, a solar inverter to change the electric current from DC to AC, cabling to transport the electricity, electrical accessories, and a mounting solution. Ideally the mounting system would position the solar panel at a normal angle of incidence to the sun therefore offering a maximum active surface to convert the light to radiation energy. Mounting structures and supporting mounting drives for sun trackers can be labor intensive, difficult to adapt to various terrains, and expensive to build and maintain. Wind or adverse forces can damage currently available solar panel systems that are floating, portable, or lower cost designs. Mounting solutions can be categorized as fixed-tilt, single axis tracking, and double axis tracking systems.

Fixed-tilt Solar Panel Systems: Fixed-tilt solar panel systems are stationary solar panels that are fixed at a certain tilt position. The solar panel remains in that position which limits the electrical energy that can be received from the sun when the panel is not at a normal angle of incidence to the sun through the day. Fixed-tilt energy efficiency can be improved by adjusting the tilt position during the year to account for the North to South position of the sun as shown in U.S. Pat. No. 8,052,100. These fixed-tilt or even adjustable fixed tilt would not benefit from the regular automated adjustments of tracking systems.

The Single-axis solar panel tracking systems typically have east to west rotating motion through each day to increase the solar energy collection efficiency. Utility or commercial scale tracking installations are commonly mounted in the ground or to a solid structure to hold the weight of the panel or array. These systems have friction bearings to allow the panel to rotate around an axis while maintaining a fixed support structure secured to the ground, roof or other structure. U.S. Pat. No. 6,058,930 for example uses a torsion tube which includes a bearing member between the torsion tube and an outer generally cylindrical journal which is connected to a pier having a footing supported in a foundation. This design requires costly structural supports, regular expensive structural pull tests, and ground mounting labor. Also, the rotational friction bearing requires energy to overcome friction between the fixed mount and rotating solar panels. These bearings will gradually wear down or crack resulting in additional maintenance cost.

Dual axis panel tracking systems have two degrees of freedom that serve as axes of rotation. This would allow tracking the sun from morning to night (east to west) and adjusting the angle from winter to summer (north to south) to optimize the energy collection of the panels. EP 2546975A1 or CN 201010244994 for example presents an automatic 2 axis tracking system using a pitching angle tracking member and a swing angle tracking member. The transmission part in this patent is presented as a rigid semi-circular arc body provided with a transmission structure which is fixed to the solar panel holder. This dual axis panel benefits from increase solar collection due to the panel being at a normal angle of incidence to the sun, however, this design still includes multiple friction bearings and additional drive components which creates more points of failure and increased maintenance.

U.S. Pat. No. 8,779,278B2 presents an inflatable member with curved surface and photovoltaic cells applied to the facet configured to rock the inflatable member and change the orientation of the facet to angle it towards the sun. A secondary inflatable member with curved surface can be placed on top of the primary inflatable member to rotate in a perpendicular axis creating a dual axis tracker. This patent design allows for ease of transporting material and temporary installations in a military exercise or on a battlefield. However, U.S. Pat. No. 8,779,278B2 does not protect against winds or adverse forces and inflatable support would not be suitable as a long-lasting solar collection system structure.

Long-lasting solar systems can be built using a "floating" foundation which prevents the need for concrete foundations, roof penetrations or in-ground holes. These systems use weight such as gravel pans, sand, or stone to secure the tracker system to the ground or roof. These "floating" trackers can secure the solar trackers from the same wind load as the traditional fixed mounted trackers. This creates more opportunities for solar panels installations where roof penetrations or concrete foundations are not feasible like commercial buildings or capped landfills.

Active solar trackers use motors and gear trains to perform solar tracking. They can use microprocessors and sensors, date and time-based algorithms, or a combination of both to detect the position of the sun. In order to control and manage the movement of these massive structures, special slewing drives are designed and rigorously tested. The technologies used to direct the tracker are constantly evolving. Recent developments at Google and Eternegy have included the use of wire-ropes and winches to replace some of the costlier and more fragile components.

The known prior art fails to offer a long-lasting, wind resistant automated solar tracking system that avoids expensive foundation mounts and friction bearing inefficiencies. In one aspect, the present disclosure features a tracker drive system that rocks one or more objects, for example solar panels or other equipment. Embodiments of the tracker drive system of this invention comprise at least one solid rocking structure. A torque tube/profile, rod, cable, or rope is connected to at least one of the rocking structures. A motor drive member rotates, pushes and/or pulls the geared torque tube, rod, cable, or rope to rock the rocking structure. In another aspect, the torque tube/profile may include other profiles such as square, rectangle or triangle to convert torque to the base frame.

The solid rocking support in one embodiment would include a curved support or frame that rolls along the surface allowing the attached solar panel to rock. A variation of this embodiment would include teeth or tracks on the curved frame for traction. Alternatively, the curved surface could comprise multiple flat segments making up the overall curved surface. In another embodiment the rocking support would be a hemisphere curved support that would rock in north, south, east and west directions. The solid curved rocking frame is different than a curved bearing in that the bearing slides across another supporting surface which involves significant energy loss through friction whereas the rocking support moves back and forth or rolls along another surface.

The motor drive member in one embodiment may include a geared motor driving a torque tube or profile. The motor in another embodiment may be a linear actuator driving a rod. The motor drive member in another embodiment may include a winch pulling a cable or rope. Other manual, hydraulic, or pneumatic motors can be used as well. Gears can be used in conjunction with the motor to adjust the force and pull distance required.

In another aspect, the present disclosure provides a solar energy collection system. Embodiments of the solar energy collection system include ate least one row of rocking solar panels which are connected together with a support frame. The first row of rocking solar panels is connected to the drive member. In another embodiment a second row of solar panels is connected to the first solar panel row through torque gears, rods, cables, or rope so that each row moves together driven by the same drive motor. Each row is aligned in a north-south direction and rocks in an east to west direction tracking the sun through the day.

In one embodiment the rope or cable would include a pulley after the last row. The pulley would allow the cable or rope to be returned to the same drive motor to provide an opposite pull force therefore allowing the same drive motor to pull the rope or cable moving the panel from east to west and then from west to east.

In another embodiment the rope or cable could be attached to a weight after the pulley or a spring providing the opposite force of the drive motor moving allowing the panels to move east to west or west to east.

In another embodiment, rods, being rigid, would connect each row to the motor, linear actuator for example, to be pushed and pulled by the motor together in unison.

In another aspect the solar panels of the collection system can be flat and positioned horizontal to the surface in the north-south direction making the row supports simpler to connect multiple panels.

In one embodiment the solar panels could be tilted in the north-south direction to improve angle of incidence with the sun. A variation of this embodiment could be to manually adjust the north south tilt position to increase the solar absorption to account for varying seasonal positions of the sun. Another variation of this embodiment would be to add another motor to automatically adjust one or multiple panels north-south position throughout the year.

Wind shields can be placed around the system to reduce the winds impact on the solar panel system. Ballast loads can be fixed or tied to the rocking panel system to hold down the system against weather or other adverse forces while still allowing the panels to rock.

Sensors can be included into the system to improve safety and operability. Wind sensors can be used to indicate excessive high winds and signal the motor to rock the solar panel system in a defensive position. Torque sensors can also indicate excessive force obstructing the rocking movement of the system indicating the need for further inspection. GPS or sun locating systems can also be used to adjust the rocking position to optimize the energy produced. All signals can be communicated to the user through computer applications allowing the user to view energy production, position, and system diagnostics.

The present disclosure generally relates to a sun tracking system; however, the present disclosure is not limited to such systems and various aspects can be applicable to other systems not described herein. The present disclosure is designed to rock one or more solar panels acting as a solar energy collection system. Rocking in this invention refers to rolling the supported solar panel so that the axis of rotation is moving as well. To follow the sun from morning to night the panel supporting frame would rock and the axis of rotation would move with the rocking panel from East to West therefore tracking the sun. This is in contrast to other systems that rotate the panels around a fixed axis or hinge. In this present disclosure, the framework, securing mechanisms, and drive motors are designed rock the system to track the sun while withstanding adverse forces such as wind and avoid friction.

According to aspects, a rocking photovoltaic system can include a frame configured to rock at least one solar panel so that the axis of rotation moves along with the rolling motion of the frame to angle the solar panel towards the sun. In one or more embodiments, the structure has a curved base. In one or more embodiments, the structure has a series of flats, tracks, or points as the base on which to rock. In one or more embodiments, the structure rocks the panel in one direction while allowing for a tilt position in the other. In one or more embodiments, the structure rocks the panel in one direction while rotating the panel on an axis in another axis. In one or more embodiments, the structure can rock in any dual axis direction.

In one or more embodiments, the structure is rocked by the use of a motor connected to the structure or panel to allow for rotating, pulling or pushing of the structure. In a particular embodiment, the motor pulls the structure and the structure is pulled back by a opposite force (weight, spring, or another motor). In a particular embodiment, the motor is geared or programmed to push the panels and pull the panels. In a particular embodiment, the motor is connected to the structure or panel by a cord, rope, wire, pole, beam, tube, frame, or other connector. In a particular embodiment, the motor drives a torque tube or profile which rotates and moves with the axis of the rocking frame. In a particular embodiment, the cord, rope, wire, pole, beam, frame, or other connector is also attached to a sensor to measure the tension or force required to move the structure. In a particular embodiment, the tension or force measured is above or below the normal force required indicating an obstruction or malfunction of the rocking system signaling the user that maintenance is needed.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure.

The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

FIG. 1 depicts a solar power collection system 100 including an array 102 of photovoltaic (PV) panel assemblies 104 that each include one or more PV panels 106 having PV cells that generate electricity from sunlight. A base 108 of each PV panel assembly 104 is attached to at least one of the PV panels 106. Each base 108 includes at least one curved rocker surface 110 that presents a first convex surface in at least a first direction to a substrate 112. The base 108 is positionable on the substrate 112 with the first direction aligned with an east-west orientation. A tracker drive unit 114 is mechanically coupled to the base via a selected one of: (i) a drive rod 116; (ii) a closed loop cable (not shown in FIG. 1); (iii) a torsion mechanism (not shown in FIG. 1) to impart a selected amounting of rolling-rocking movement of the base 108 across the substrate 112 to position the PV panels 106 to receive sunlight.

Figure 2A:
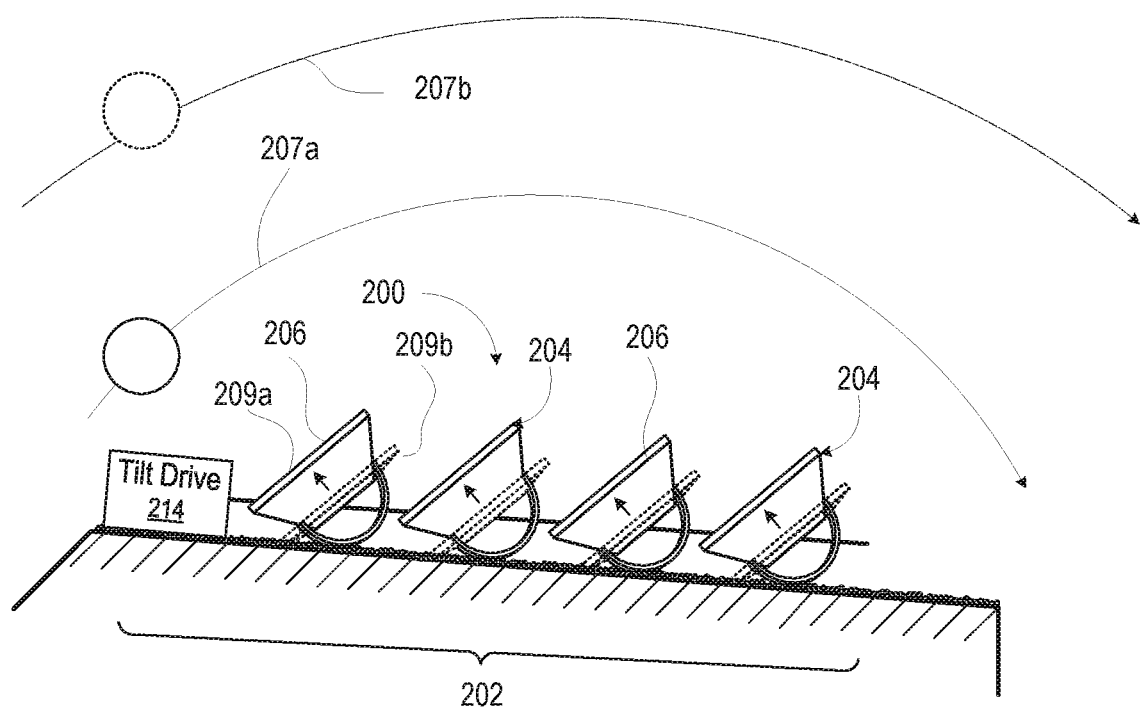
FIG. 2A depicts a solar power collection system including an array of PV panel assemblies that each include one or more PV panels that can be positioned in tilted position or an untilted position for seasonal variation and rocked east for daily variation, according to one or more embodiments.
Figure 2B:
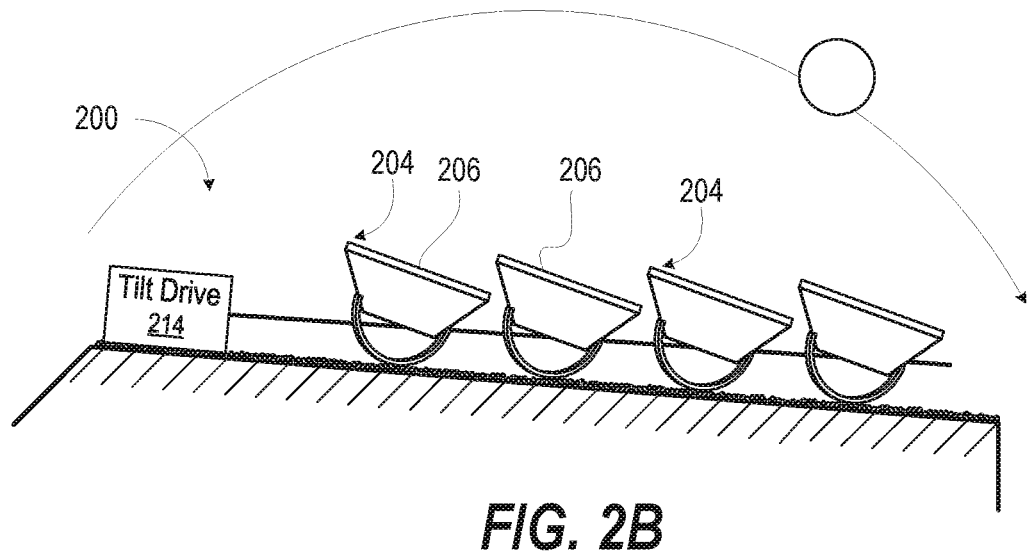
FIG. 2B depicts the solar power collection system of FIG. 2A that is rocked westward for daily variation, according to one or more embodiments.

FIG. 2A depicts a solar power collection system 200 including an array 202 of photovoltaic (PV) panel assemblies 204 that each include one or more PV panels 206 that can be positioned in one of a tilted position 209a for a season with a solar path 207a that is low in the sky and an untilted position 209b for a solar path 207b that is high in the sky. PV panel assemblies 204 are rocked by tracker drive unit 214 to an eastward orientation. FIG. 2B depicts PV panel assemblies 204 that are rocked by tracker drive unit 214 to a westward orientation.

In one or more embodiments, the rocking solar panel system includes solid curved supports with the curve of the support rocking on a surface and solar panel fixed atop. In one or more embodiments, the curved support is rocked by cords, rope, rods or drive gears driven by a motor to angle the fixed solar panel toward the sun. In one or more embodiments, mounted motor(s), connecting rods, or weights act as methods of holding the support and panel from moving out of position by the wind or other adverse forces.

In one or more embodiments, the solar panel(s) themselves may be curved. The curvature of the photovoltaic panel may be symmetric about the longitudinal and lateral axes.

Alternatively, the curvature may be independently symmetric about the longer longitudinal axis and the shorter lateral axis. In one or more embodiments, the solar panel can be tilted, and its surface can be mechanically or electronically adjusted to become flat, curved in a concave shape or curved in a convex shape. The panel may have an arbitrary outer perimeter shape.

In one or more embodiments, the substrate upon which the base frame is rocking may include a matching track pattern to restrain the base frame into a set course and reduce the chance of the base frame slipping out of place (not shown).

Figure 3:
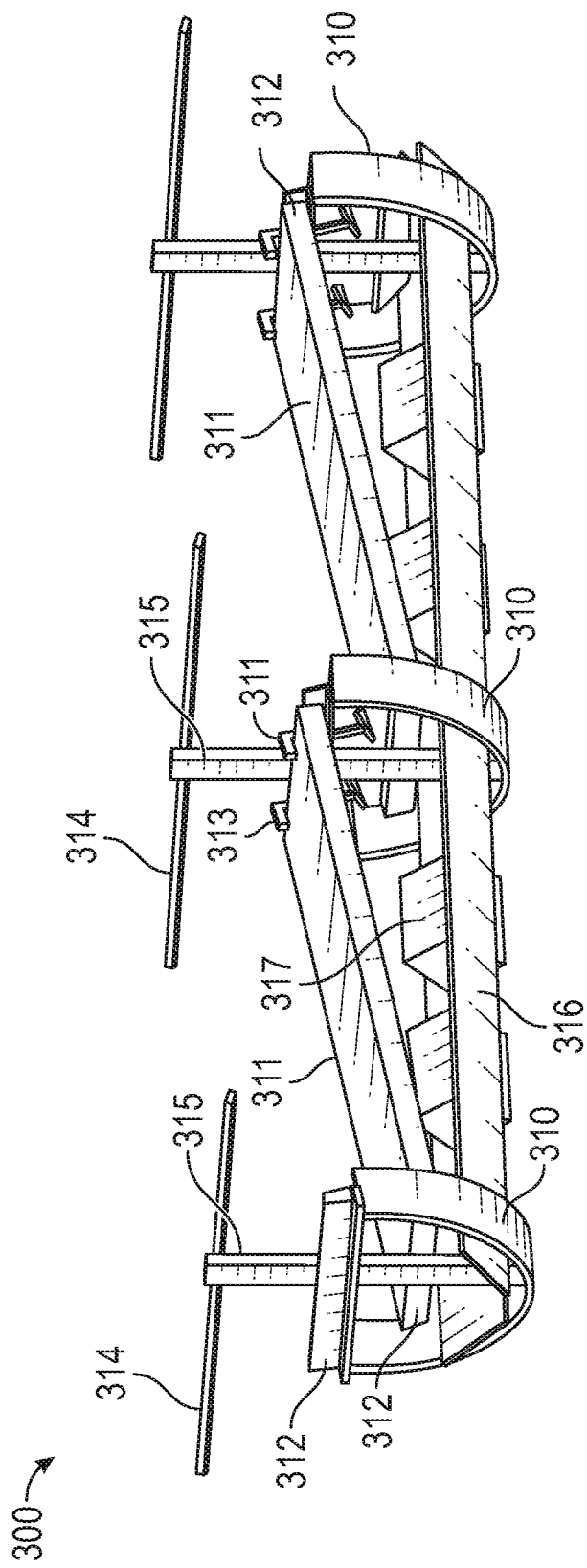
FIG. 3 is a schematic view of a solid curved rocking support with attached solar panel, according to one or more embodiments.

FIG. 3 depicts an example of the present disclosure with a solar power collection system 300 having a curved frame 310 which includes the solar panel 311 thereon. The curve is typically oriented to rock in the east to west direction. The solar panel will rock with the frame to track the sun and minimize the angel of incidence therefore maximizing the energy absorption. Tilt supports 312 are fixed to the curved to hold the panel in a fixed tilt position typically to account for the North/South position of the sun. Clamps 313 are used to hold the panel in place after it is installed on the tilt supports. FIG. 3 also shows an example of using a rod or cable 314 to push and pull a lever arm 315 which is fixed to the rocking frame. The further out the rod or cable is attached to the lever, the more mechanical advantage to rock an array of panels. The rod or cable would provide some security from adverse wind or other forces. FIG. 3 also shows how a ballast pan 316 and weights 317 can be used to weigh down the rocking solar panel system.

Figure 4:
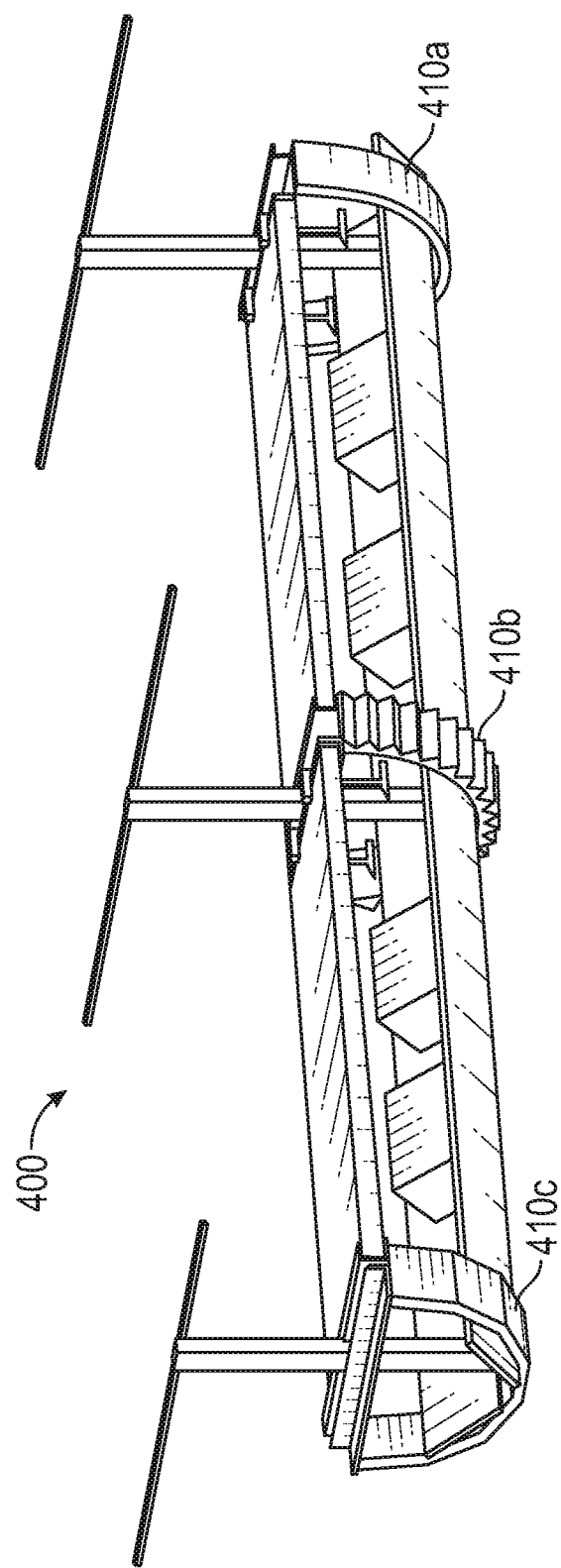
FIG. 4 is a view of various types of tractions that could be for the curved support, according to one or more embodiments.

FIG. 4 shows a front side view of a solar power collection system 400 having modified curved frames 410a-c. Depending on the surface or conditions, the curve can be smooth 410a, geared 410b, or a series of flat segments 410c. For rough terrain a gears surface may be helpful for traction. On a flat rooftop, a smooth surface may be more appropriate to protect the roof. A series of flats may help provide a series of stable positions to avoid unwanted movement in windy conditions. Other modifications to the curved surface can be incorporated with the surface on which the solar panel is rocking to provide accuracy in movement and avoid the frame from slipping out of position. FIG. 4 also shows two different positions of the curved frame and solar panel from morning to day to evening. The rocking movement changes the orientation of the panel to face the sun throughout the day. The rotation axis also moves east to west as the frame rolls on the ground. This avoid the slip friction required in other trackers where the axis is fixed.

Figure 5:
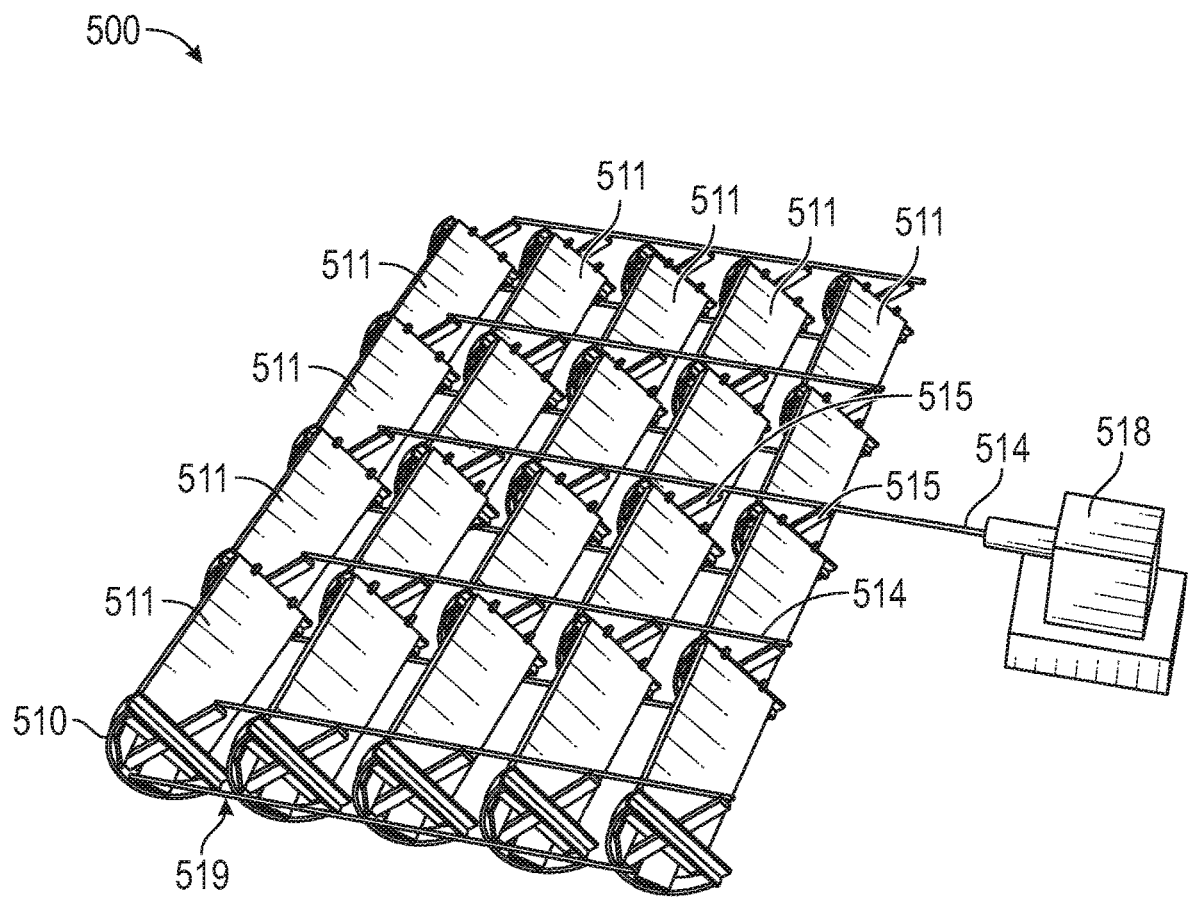
FIG. 5 is a schematic view of an array of rocking solar panels driven by a linear motor and rod system, according to one or more embodiments.

FIG. 5 shows a top side view of an array 500 of solar panels 511 on curved frames 510. In FIG. 5 the solar panels are connected by rods so all frames rock in unison. The rods are moved by a motor—a linear actuator 518 for example—which pushes and pulls the rods. The force applied to the rods 514 in one direction will move the lever arm 515 which rocks the frame tracking the sun. An opposite force is applied from the motor to the rod which moves the lever arm and rocking frame back to its start position for the next sun rise. Support rods 519 are attached to the curve frame and ensure spacing is maintained between the rocking frames. This rod can be fixed at one end to ensure the frames do not slip out of position while being pushed and pulled.

Figure 6:
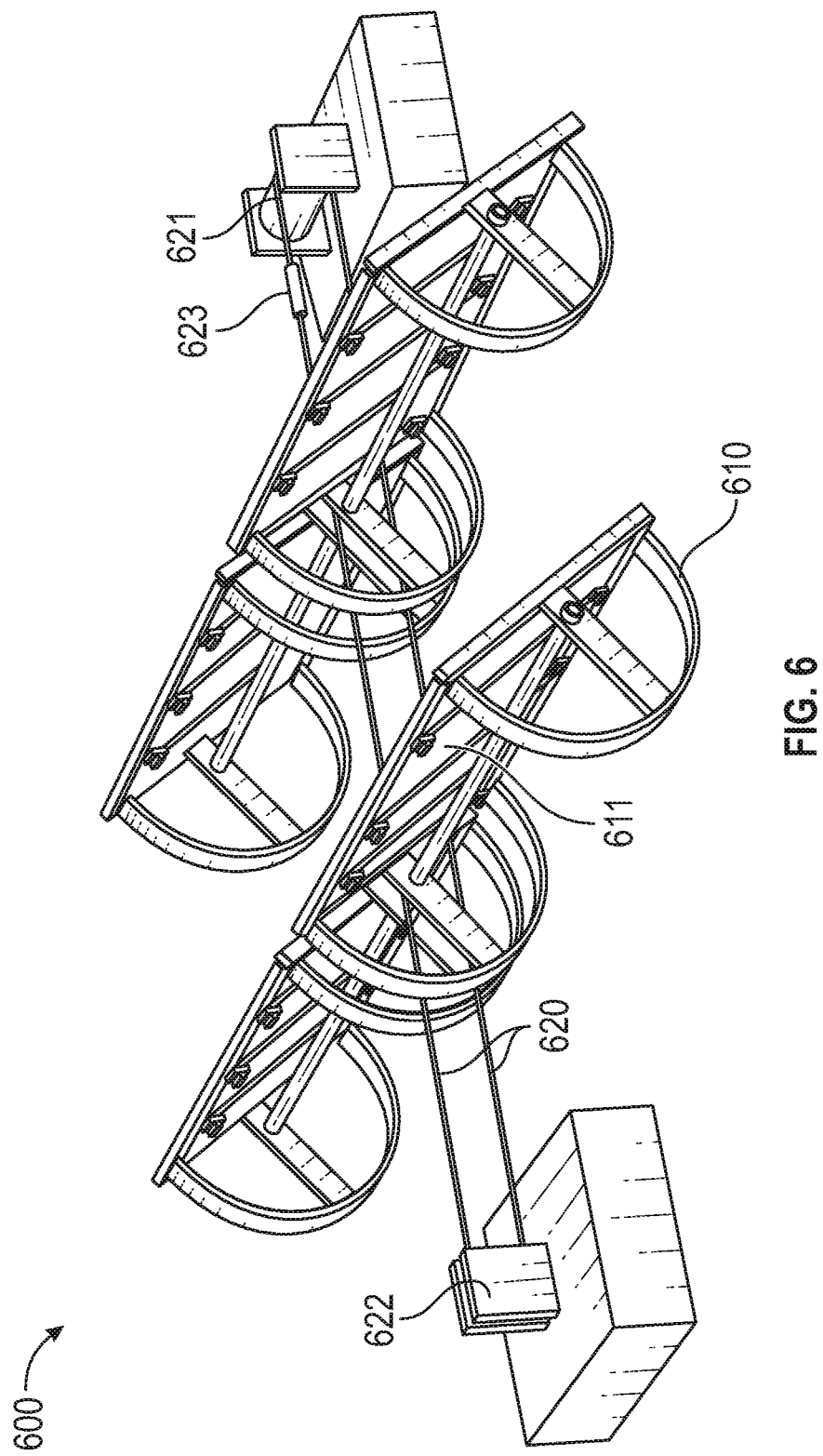
FIG. 6 is a schematic view of an array of rocking solar panels driven by a winch motor and cord or rope system, according to one or more embodiments.

FIG. 6 shows a top back side view of an array of solar panels 611 and curved frames 610 which are moved by a cable 620 and a winch motor 621. To be able to apply a force to track the sun and an opposite force to return the panels to a start position, the cable or wire uses a pulley 622 to provide a return line to the motor. Instead of a pulley and return line, a spring or pulley weight could be used to provide an opposite force to the pulling of the winch. Also, in FIG. 6, you can see how a torque sensor 623 can be included in-line with the cable to indicate when too high or too low of force is required to move the system indicating obstruction, high wind, or other failures. This signal would not only communicate to an operator for maintenance check, but could also be used to automatically adjust the panels to a wind resistant position. Other sensors like wind or sun tracking sensors could be used to signal the system to adjust position accordingly.

Figure 7:
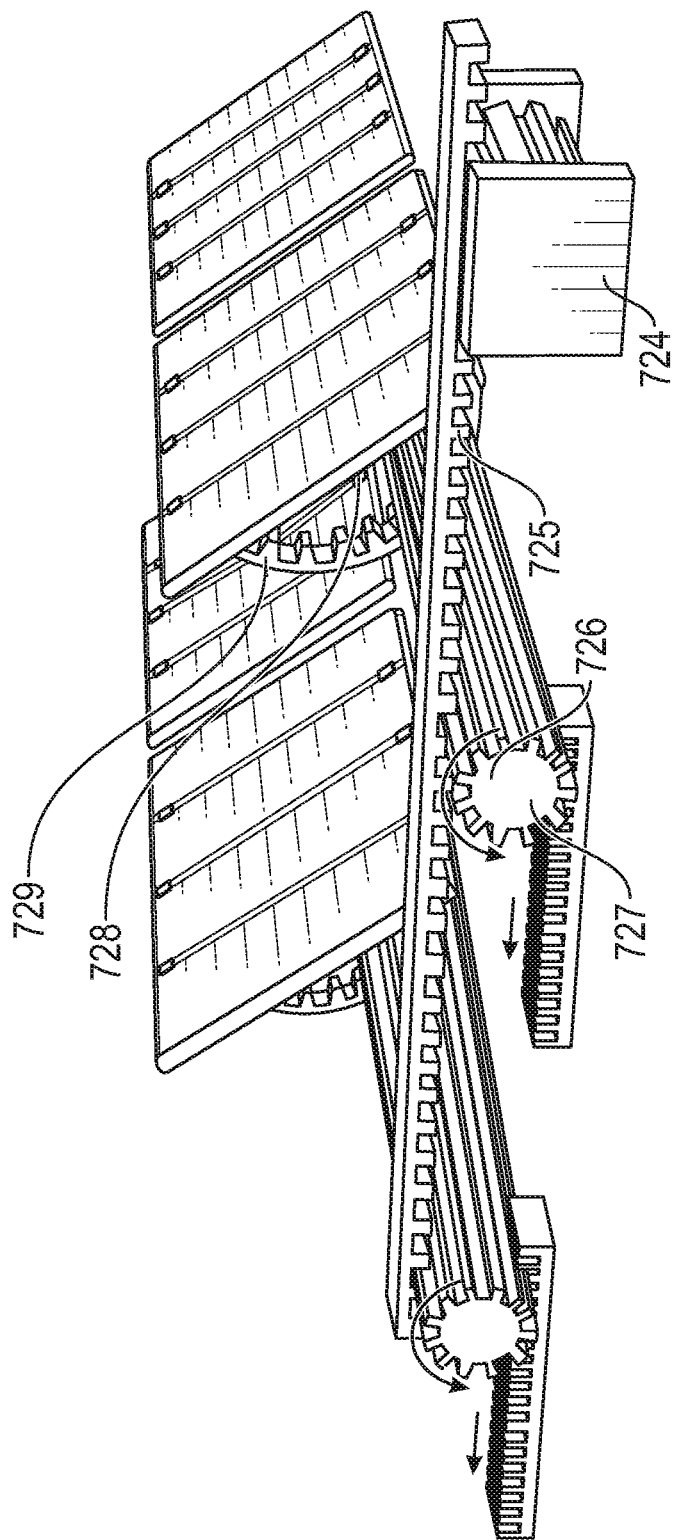
FIG. 7 is a schematic view of an array of rocking solar panels driven by gears, according to one or more embodiments.

FIG. 7 shows a third type of motor and drive system which uses a gear motor 724 that moves a gear system 725 which rotates and moves the gear drive 726. The gear system is set-up so that the gear drive not only rotates, but moves along the supporting gear so that the axis of the gear drives 727 move in similar motion to the axis of the rocking frame's axis 728. In this case the curved rocking frame would also have gear teeth 729 to align with the gear drive.

Figure 8:
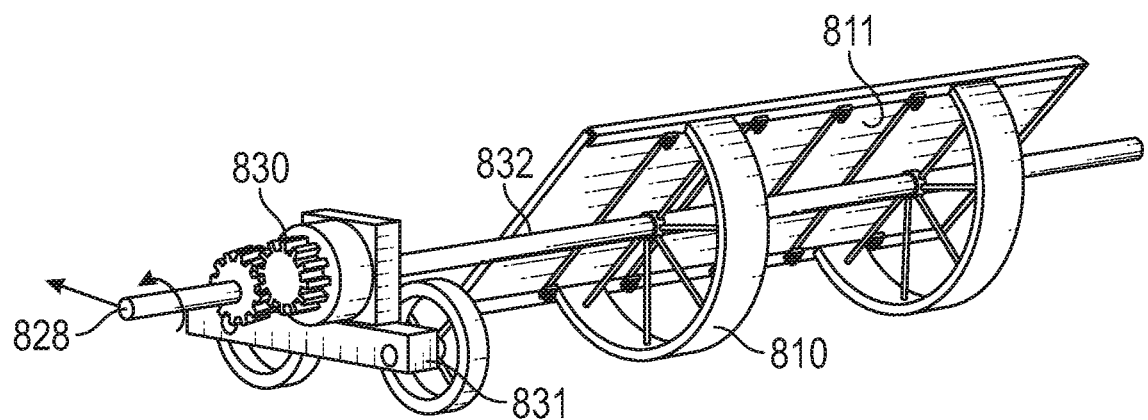
FIG. 8 is a schematic view of a motor that moves along with the axis of rotation of the solar array, according to one or more embodiments.

FIG. 8 shows a motor 830 that is designed to move east-west along in the rocking direction of the solar array. The motor is mounted on a movable platform 831. The motor rotates a torque tube or profile 832 which then rotates each of the connecting rocking frames 810. As the curved frame rocks in the direction of rotation, the motor moves in the same direction in line with the moving axis of rotation 828.

Figure 9:
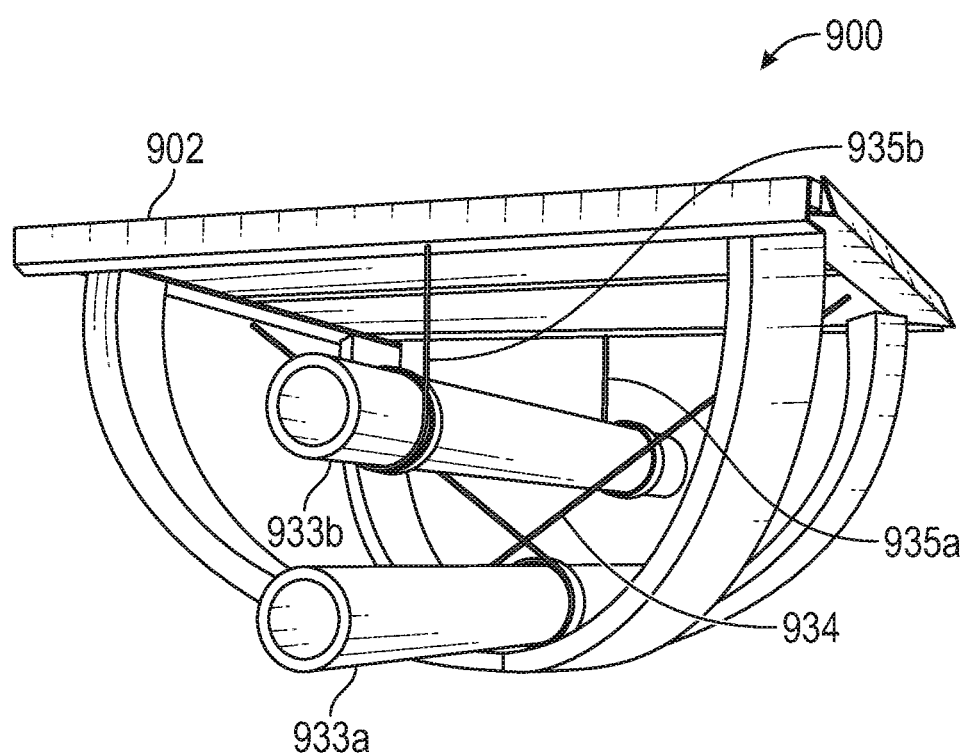
FIG. 9 is a perspective view of a curved hemisphere panel assembly which can be used to rock the panel in east-west and north-south directions, according to one or more embodiments.

In one or more embodiments, a curved hemisphere panel assembly 900 has a solar panel 902 that tis rocked or rotated in a north and south direction along with being rocked in the east and west direction. FIG. 9 shows an example of how a curved frame shaped similar to a hemisphere can be used to rock the panel east-west and north-south. FIG. 9 shows two separate torque tubes—933a and 933b. Torque tube 933a would use one cable 934 to rock the panel east-west. Another torque tube 933b and cables 935a and 935b would rock the panel north-south. The drive polls would be driven by a motor and control multiple panels.

Figure 10A:
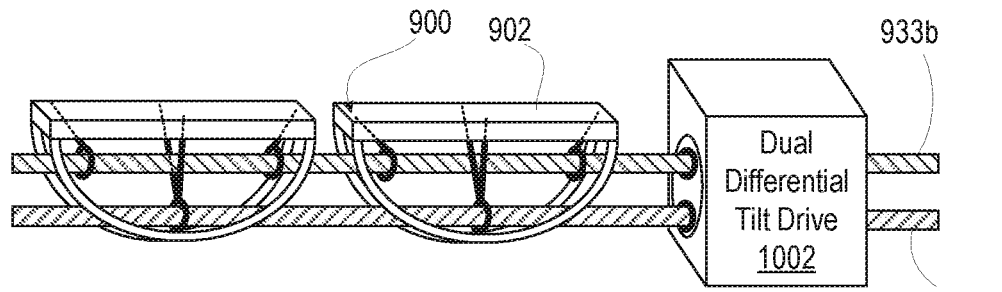
FIG. 10A is a side view of an array of the curved hemisphere panel assemblies of FIG. 9 aligned to rock east-west and in a neutral position, according to one or more embodiments.
Figure 10B:
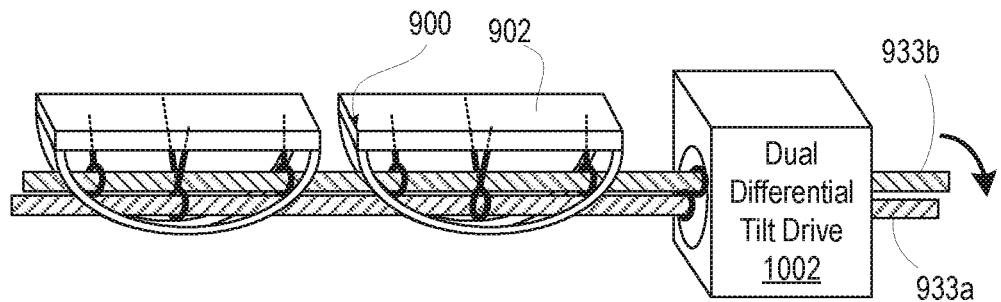
FIG. 10B is a side view of the array of the curved hemisphere panel assemblies of FIG. 9 tilted southward for seasonal variation, according to one or more embodiments.
Figure 10C:
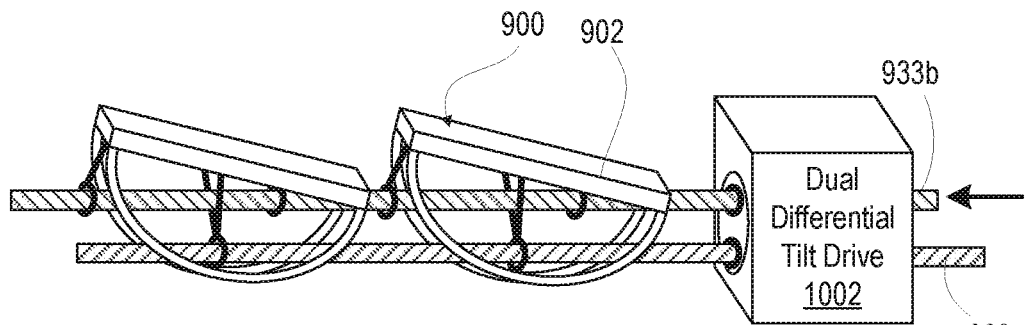
FIG. 10C is a side view of the array of the curved hemisphere panel assemblies of FIG. 9 rocked to an eastward orientation for daily solar position, according to one or more embodiments.
Figure 10D:
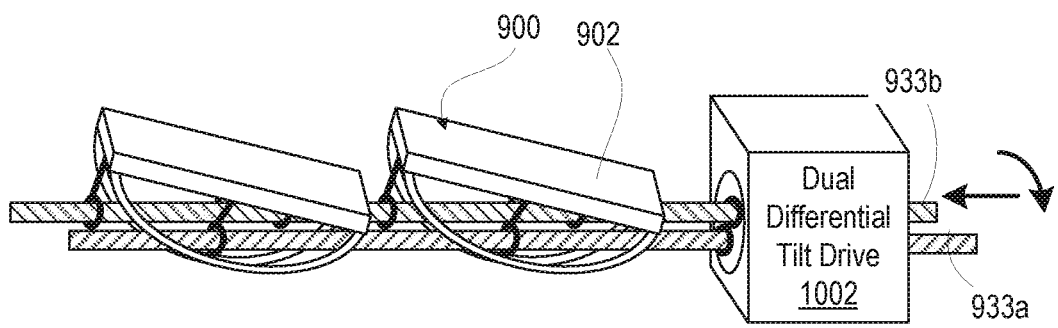
FIG. 10D is a side view of an array of the curved hemisphere panel assemblies of FIG. 9 tilted southward for seasonal variation and rocked to an eastward orientation for daily solar position, according to one or more embodiments.

FIG. 10A is a side view of an array 1000 of the curved hemisphere panel assemblies 900 of FIG. 9 having a dual differential tilt drive 1002 that maintains bottom and top torque tubes 933a, b aligned to rock east-west and in a neutral position. FIG. 10B is a side view of the array 1000 of the curved hemisphere panel assemblies 900 of FIG. 9 tilted southward for seasonal variation by rotating bottom and top torque tubes 933*a, b* clockwise as viewed from the curved hemisphere panel assemblies 900. FIG. 10C is a side view of the array 1000 of the curved hemisphere panel assemblies 900 of FIG. 9 rocked to an eastward orientation for daily solar position by extending top torque tubes 933*b* distally away from dual differential tilt drive 1002. FIG. 10D is a side view of an array of the curved hemisphere panel assemblies of FIG. 9 tilted southward for seasonal variation rotating bottom and top torque tubes 933*a, b* clockwise as viewed from the curved hemisphere panel assemblies 900 and rocked to an eastward orientation for daily solar position by extending top torque tubes 933*b* distally away from dual differential tilt drive 1002.

Figure 11:
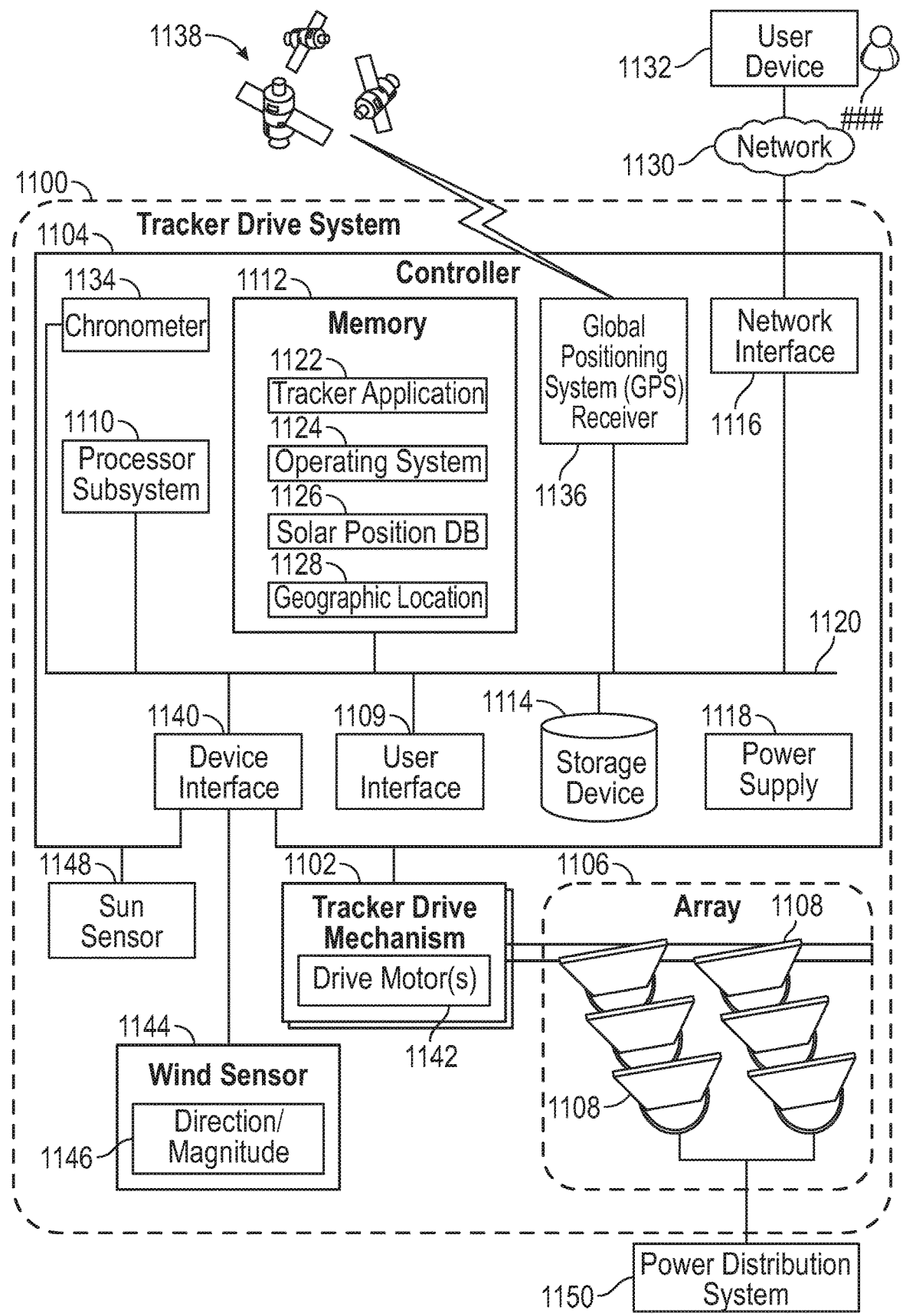
FIG. 11 is a functional block diagram of a tracker drive system having a tracker drive mechanism that positions an array of solar collection units for efficient collection of solar energy, according to one or more embodiments.

FIG. 11 illustrates a tracker drive system 1100 having a tracker drive mechanism 1102, managed by a controller 1104 that positions an array 1106 of solar collection units 1108 for efficient collection of solar energy. For purposes of this disclosure, the controller 1104 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display as part of user interface 1109. The controller 1104 may also include one or more buses operable to transmit communications between the various hardware components.

In a particular embodiment, the controller 1104 includes a processor subsystem ("processor") 1110, a memory 1112 communicatively coupled to processor subsystem 1110, storage devices 1114, a network interface 1116 communicatively coupled to processor subsystem 1110, and a power supply 1118 electrically coupled to processor subsystem 1110. Processor subsystem 1110 is coupled to system memory 1112 via system interconnect 1120. System interconnect 1120 can be interchangeably referred to as a system bus, in one or more embodiments. System interconnect 1120 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component interconnect (PCI) bus, PCI-Express bus, HyperTransport (HT) bus, and Video Electronics Standards Association (VESA) local bus.

Processor subsystem 1110 may include any system, device, or apparatus configured to interpret and/or execute program instructions and/or process data, and may include, without limitation a microprocessor, microcontroller, digital signal processor (DSP), Application Specific Integrated Circuit (ASIC), or any other digital or analog circuitry configured to interpret and/or execute program instructions and/or process data such as a tracker application 1122, an operating system 1124, solar position database 1126, and computer data such as geographic location information 1128. In some embodiments, processor 1110 may interpret and/or execute program instructions and/or process data stored in memory 1112 and/or another component of controller 1104. Memory 1112 may be communicatively coupled to processor 1110 and may include any system, device, or apparatus configured to retain program instructions and/or data for a period of time (e.g., computer-readable media). By way of example without limitation, memory 1112 may include RAM, EEPROM, a PCMCIA card, flash memory, magnetic storage, opto-magnetic storage, or any suitable selection and/or array of volatile or non-volatile memory that retains data after power to controller 1104 is turned off or power to controller 1104 is removed. Network interface 1116 may include any suitable system, apparatus, or device operable to serve as an interface between controller 1104 and network 1130. Network interface 1116 may enable the controller 1104 to communicate over network 1130 to a user equipment device 1132 that can manually control or reconfigure settings of the controller 1104 via wireless network 1130. The network 1130 can use any suitable transmission protocol and/or standard, including without limitation all transmission protocols and/or standards enumerated herein with respect to the discussion of network 1130. Tracking of the sun by controller 1104 can be assisted by a chronometer 1134 and a global positioning system (GPS) receiver 1136 that receives signals from GPS satellites 1138.

A device interface 1140 can link to drive motor(s) 1142 or systems useful in coordinating movement of the array 1106. The device interface 1140 can link to a wind sensor 1144 that senses wind direction and magnitude information 1146. The device interface 1140 can link to a sun sensor 1148. The controller 1104 is communicatively coupled to the wind and sun sensors 1144, 1148 and memory 1112 and that executes tracker application 1122 to enable the tracker drive system 1100 to optimize solar energy collection for a power distribution system 1150 with mitigation for wind.

Figure 12A:
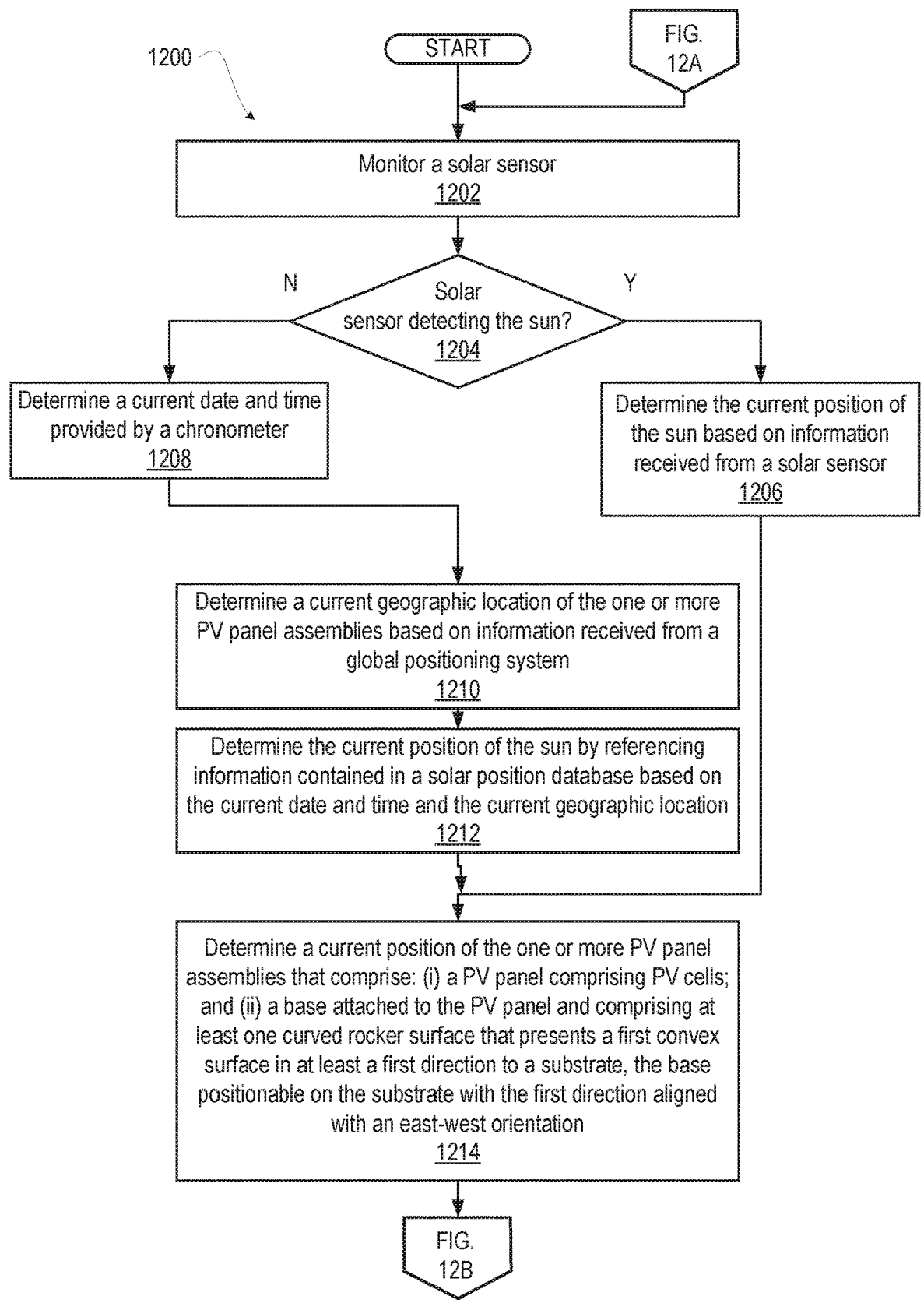
FIGS. 12A-B present a flow diagram of a method for efficiently and economically collecting solar energy, according to one or more embodiments.
Figure 12B:
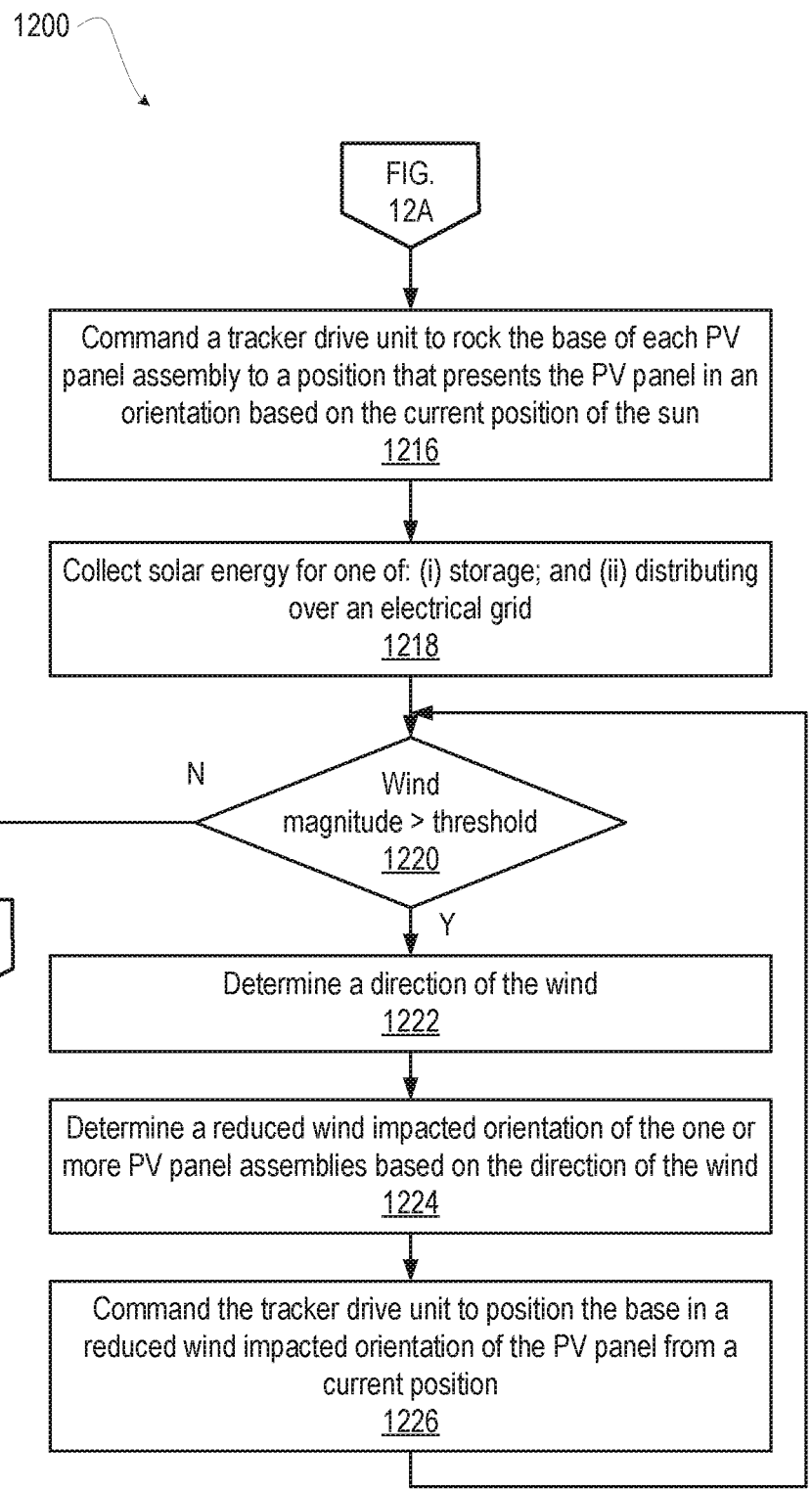
Figure 13A:
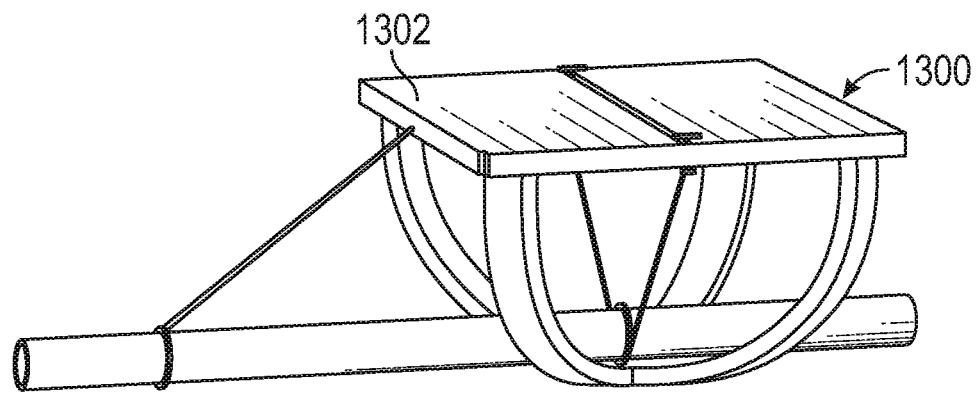
FIG. 13A is a three-dimensional view of an example curved hemisphere panel assembly mounted to a drive tube and a guide rope in a horizontal orientation, according to one or more embodiments.
Figure 13B:
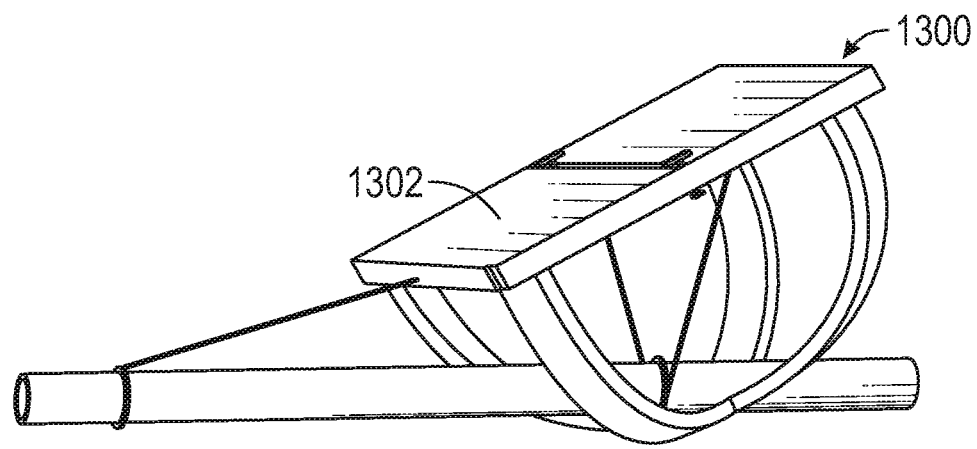
FIG. 13B is a three-dimensional view of the example curved hemisphere panel assembly of FIG. 13A tilted to the left by the guide rope to the right, according to one or more embodiments.
Figure 13C:
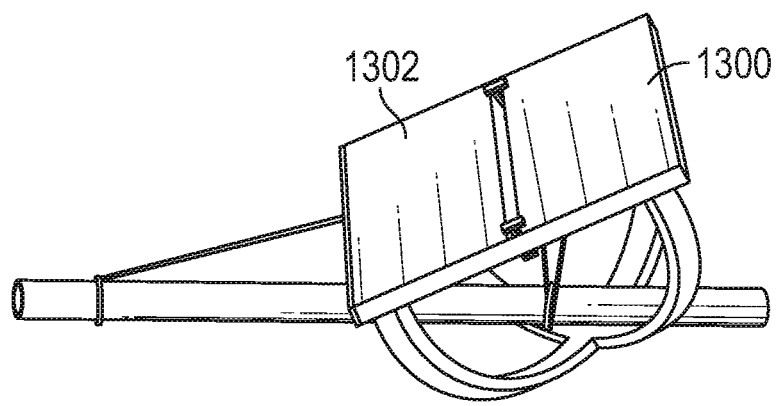
FIG. 13C is a three-dimensional view of the example curved hemisphere panel assembly of FIG. 13A tilted to the left by the guide rope to the right and rotated by a torque tube, according to one or more embodiments.
Figure 13D:
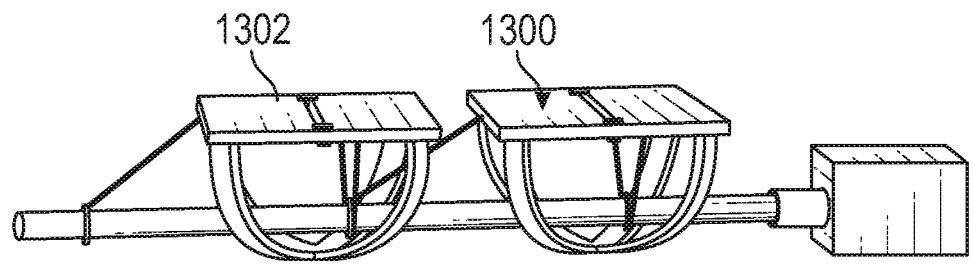
FIG. 13D is a three-dimensional view of an array of the example curved hemisphere panel assemblies mounted to a drive tube and a guide rope in a horizontal orientation, according to one or more embodiments.
Figure 13E:
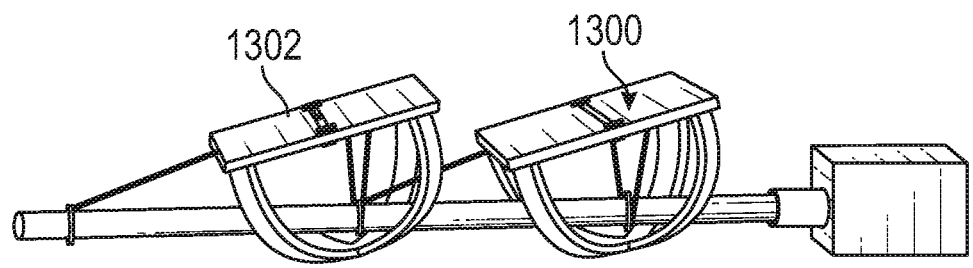
FIG. 13E is a three-dimensional view of the array of the example curved hemisphere panel assemblies of FIG. 13D tilted to the left by the guide rope to the right, according to one or more embodiments.
Figure 13F:
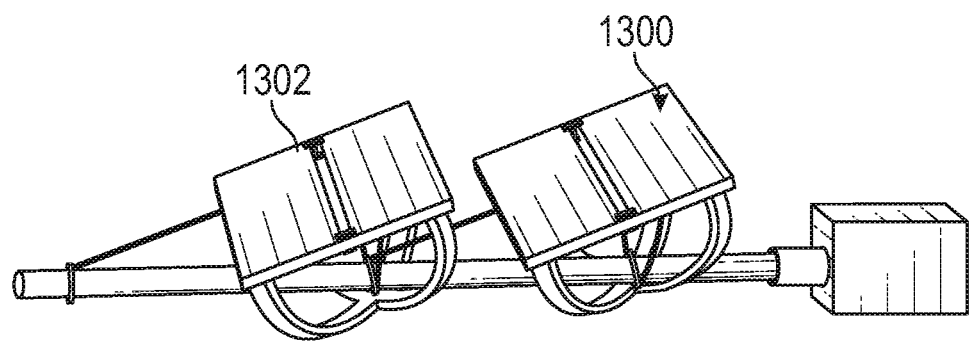
FIG. 13F is a three-dimensional view of the array of the example curved hemisphere panel assemblies of FIG. 13D tilted to the left by the guide rope to the right and rotated by a torque tube, according to one or more embodiments.

FIGS. 12A-B depict a flow diagram of method 1200 of efficiently and economically collecting solar energy. Controller 1104 (FIG. 11) enables the tracker drive system 1100 to perform method 1200. With initial reference to FIG. 12A, method 1200 includes monitoring a solar sensor (block 1202). A determination is made, in decision block 1204, whether the solar sensor is detecting the sun. In response to the solar sensor tracking the sun, method 1200 includes determining the current position of the sun based on information received from a solar sensor (block 1206). In response to the solar sensor is not tracking the sun, method 1200 includes determining a current date and time provided by a chronometer (block 1208). Method 1200 includes determining a current geographic location of the one or more PV panel assemblies based on information received from a global positioning system (GPS) receiver (block 1210). In one or more embodiments, the location is user input information. Method 1200 includes determining the current position of the sun by referencing information contained in a solar position database based on the current date and time and the current geographic location (block 1212). After determining solar position in either blocks 1206 or 1212, method 1200 includes determining a current position of the one or more PV panel assemblies that comprise: (i) a PV panel comprising PV cells; and (ii) a base attached to the PV panel and comprising at least one curved rocker surface that presents a first convex surface in at least a first direction to a substrate, the base positionable on the substrate with the first direction aligned with an east-west orientation (block 1214). In one or more embodiments, a drive mechanism of a tracker drive unit has closed loop feedback of a position of a mechanism that is mechanically coupled to the one or more PV panel assemblies, such as an encoder. Continuing with reference to FIG. 12B, method 1200 includes commanding a tracker drive unit to rock the base of each PV panel assembly to a position that presents the PV panel in an orientation based on the current position of the sun (block 1216). Once the sun sets, this commanded position can include prepositioning the one or more PV panel assemblies for sunrise. Method 1200 includes collecting solar energy for one of: (i) storage; and (ii) distributing over an electrical grid (block 1218).

In one or more embodiments, method 1200 includes determining whether wind magnitude exceeds a threshold (decision block 1220). In response to determining that the wind magnitude does not exceed the threshold, method 1200 returns to block 1202. In response to determining that the wind magnitude exceeds the threshold, method 1200 includes determining a direction of the wind (block 1222). Method 1200 includes determining a reduced wind impacted orientation of the one or more PV panel assemblies based on the direction of the wind (block 1224). For example, lacking wind direction information, the reduced wind impacted orientation can default to a centered position with the PV panel presenting a horizontal surface to the wind. For another example, based on wind direction information, the reduced wind impacted orientation can tip the PV panel toward a perpendicular orientation with the wind to increase downward frictional engagement with the substrate. Method 1200 includes commanding the tracker drive unit to position the base in a reduced wind impacted orientation of the PV panel from a current position (block 1226). Then method 1200 returns to block 1220.

In one or more embodiments, a lower portion of the base has a half cylinder shape having a parallel second convex surface that support the base for one-axis rolling-rocking movement in the first direction. In one or more embodiments, the PV panel is adjustably attached to the base to a selected tilt in a second direction that is orthogonal to the first direction for orienting the PV panel for north-south seasonal variation in movement of the sun. In one or more embodiments, a lower portion of the base has a hemispheric shape having an intersecting second convex surfaces that supports the base for second axis rolling-rocking movement in a second direction that is orthogonal to the first direction. In a particular embodiment, the tracker drive unit has first and second drive rods respectively coupled flexibly to a bottom and a top portion of the base. The tracker drive unit selectively extends and retracts the second drive rod to tilt the base in the second direction and selectively translating the second drive rod in the first direction to roll the base in the first direction. In one or more embodiments, the first convex surface comprises a series of annular flat surfaces for rolling the base in discrete angular positions. In one or more embodiments, the first convex surface includes outward projections grip a loose angular composition of the substrate to resist at least one of: (i) a downward slope of the substrate; and (ii) force of wind. In one or more embodiments, the base includes at least one ballast weight to resist force of wind.

FIGS. 13A-F depict an example of how a curved frame 1300 shaped similar to a hemisphere can be used to rock the panel 1302 east-west and north-south. This can be accomplished by the use of one or more torque tubes or profile that attach to the curved frame 1300 via a wire or rope and pull or push the frame as the torque profile is turned to tilt and rock the panel along one axis. The same tube or profile could be pushed or pulled in the second axis. Alternatively, a second tube, profile or cable could be used to rotate the panel in the second direction. In one or more embodiments, a solar power collection system can include a tracker drive unit that comprises of at least one drive rod, cable, or profile (torsion) mechanism to rock the array while pushing or pulling the frame parallel to the other direction.

Various embodiments provide a photovoltaic apparatus having a solar panel, a support structure, a mounting member, and at least one reflector configured to reflect light onto a first side and/or a second side of the solar panel. In one or more embodiments, the devices provide for an increase of sunlight directed towards the solar panel. In another non-limiting embodiment, the reflector(s) may have a material, such as but not limited to a metal; a plastic (e.g. polyethylene, polypropylene, polyvinylchloride, etc.; a rubber; and combinations thereof. In another non-limiting embodiment, the reflector(s) may be reflective by itself (e.g. a reflective metal), or the material of the reflector(s) may have a reflective coating or reflective paint applied thereto. In yet another non-limiting embodiment, the reflector(s) may have a ridged material, a perforated material, a corrugated material, and combinations thereof.

In another non-limiting embodiment, at least one dimension of the reflector(s) may extend beyond at least one dimension of the solar panel. For example, the width of the reflector(s) may be wider or narrower than the solar panel; similarly, the length of the reflector(s) may be longer or shorter than the solar panel. The dimensions of the reflector(s) and/or the solar panel depends on many factors, such as but not limited to cost, a direction of the sun at any given time, and the like. Such embodiment(s) may result in an improved ability of the solar panel (and embodied bifacial solar cell(s)) to capture solar energy.

In another non-limiting embodiment, the reflector(s) may have an orientation substantially parallel to the solar panel, or the reflector(s) may have an orientation substantially perpendicular to the solar panel. As used herein, the term 'substantially' parallel or 'substantially' perpendicular refers to reflector(s) within 20 degrees or less that are parallel or perpendicular to the plane of the solar panel, alternatively the reflector(s) may be within 10 degrees or less that are parallel or perpendicular to the plane of the solar panel, or the reflector(s) may be within 5 degrees or less that are parallel or perpendicular to the plane of the solar panel in another non-limiting embodiment.

In another non-limiting embodiment, the photovoltaic apparatus may include a solar panel having a first side and a second side where the solar panel includes at least one bifacial cell (not shown). In a non-limiting embodiment, the first side may face the sun. As used herein, a 'bifacial' solar cell is a solar cell within the solar panel where the bifacial solar cell has a front side and a back side, and both sides are configured to capture solar energy.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A solar power collection system comprising:
   a photovoltaic (PV) panel assembly comprising:
      a PV panel comprising PV cells; and
      a single axis or dual axis tracker frame attached to at least one row of PV panels; having a base attached to the row of PV panels and comprising at least one curved rocker surface that presents a first convex surface in at least a first direction to a fixed substrate and wherein the at least one curved rocker surface has a point of contact with the fixed substrate that changes with respect to the fixed substrate, the base positionable on the fixed substrate with the first direction aligned with an east-west orientation, wherein at least one curved rocker surface with a moving axis supports the weight of the panels, and allows the entire single axis or dual axis tracker frame to rock from east to west, tracking the sun while avoiding the need for pillars or a frame to support a fixed axis or hinge;
   a tracker drive unit mechanically coupled to the base via a selected one of: (i) a drive rod; (ii) a closed loop cable; (iii) a torsion mechanism to impart a selected amount of rolling-rocking movement of the single axis or dual axis tracker frame across the fixed substrate, which allows the system to follow the sun from morning to night by adjusting the rocking and moving axis of rotation, thus avoiding slip friction with a fixed rotation axis and withstanding adverse forces such as wind.

2. The solar power collection system of claim 1, wherein a lower portion of the base has a half cylinder shape comprising a parallel second convex surface that support the base for one-axis rolling-rocking movement in the first direction.

3. The solar power collection system of claim 1, wherein the PV panel is adjustably attached to the base to a selected tilt in a second direction that is orthogonal to the first direction for orienting the PV panel for north-south seasonal variation in movement of the sun.

4. The solar power collection system of claim 1, wherein the first convex surface comprises a series of annular flat surfaces for rolling the base in discrete angular positions.

5. The solar power collection system of claim 1, wherein the first convex surface comprises outward projections grip a loose angular composition of the fixed substrate to resist at least one of: (i) a downward slope of the fixed substrate; and (ii) force of wind.

6. The solar power collection system of claim 1, wherein the base comprises at least one ballast weight to resist force of wind.

7. The solar power collection system of claim 1, further comprising:
   a chronometer;
   a memory containing a solar position database and a geographic location of the solar power collection system; and
   a controller communicatively coupled to the tracker drive unit, the chronometer, and
   the memory, the controller executing a tracker application that enables the solar power collection system to:
      determine a current date and time provided by the chronometer;
      determining and a corresponding position of the sun contained in the solar position database based on the current date and time; and
      command the tracker drive unit to rock the base to a position that presents the PV panel in an orientation based on the corresponding position of the sun.

8. The solar power collection system of claim 1, further comprising:
   a solar sensor; and
   a controller communicatively coupled to the tracker drive unit and the solar sensor, the controller executing a tracker application that enables the solar power collection system to:
      determine a current position of the sun based on information received from the solar sensor; and
      command the tracker drive unit to rock the base to a position that presents the PV panel in an orientation based on the current position of the sun.

9. The solar power collection system of claim 1, wherein the tracker drive unit comprises:
   a wind sensor; and
   a controller communicatively coupled to the tracker drive unit and the wind sensor, the controller executing a tracker application that enables the solar power collection system to:
      determine that wind magnitude sensed by the wind sensor exceeds a threshold; and
      command the tracker drive unit to position the base in a reduced wind impacted orientation of the PV panel from a current position in response to detecting the wind magnitude that exceeds the threshold.

10. The solar power collection system of claim 9, wherein:
   the wind sensor senses direction of wind; and
   the controller determines the reduced wind impacted orientation based on the direction of the wind.

11. The solar power collection system of claim 9, further comprising a global positioning system (GPS) receiver, wherein the controller is communicatively coupled to the GPS receiver, the controller executing the tracker application that determines the geographic location of the solar power collection system based on information received from the GPS receiver.

12. The solar power collection system of claim 1, wherein a lower portion of the base has a hemispheric shape comprising an intersecting second convex surfaces that supports the base for second axis rolling-rocking movement in a second direction that is orthogonal to the first direction.

13. The solar power collection system of claim 12, where in the tracker drive unit comprises first and second drive rods respectively coupled flexibly to a bottom and a top portion of the base, the tracker drive unit selectively extending and retracting the second drive rod to tilt the base in the second direction and selectively translating the second drive rod in the first direction to roll the base in the first direction.

\* \* \* \* \*